United States Patent [19]

Rempel et al.

[11] Patent Number: 5,075,388

[45] Date of Patent: Dec. 24, 1991

[54] AMINE MODIFIED HYDROGENATION OF NITRILE RUBBER

[76] Inventors: Garry L. Rempel, 532 Sandbrooke Court, Waterloo, Ontario, Canada, N2T 2H4; Neil T. McMannus, 400 Albert Street, Apt. 8, Waterloo, Ontario, Canada, N2L 3V3

[21] Appl. No.: 626,832

[22] Filed: Dec. 13, 1990

[51] Int. Cl.$^5$ .................................................. C08F 8/04
[52] U.S. Cl. ................................ 525/338; 525/329.3; 525/339
[58] Field of Search ................................ 525/338, 339

[56] References Cited

U.S. PATENT DOCUMENTS

| | | |
|---|---|---|
| 3,700,637 | 10/1972 | Finch, Jr. . |
| 4,071,676 | 1/1978 | Werner et al. ............... 525/338 |
| 4,384,080 | 5/1983 | Mutsubara et al. ............ 525/338 |
| 4,384,081 | 5/1983 | Kubo et al. . |
| 4,464,515 | 8/1984 | Rempel et al. . |
| 4,503,196 | 3/1985 | Rempel et al. . |
| 4,631,315 | 12/1986 | Buding et al. . |
| 4,812,528 | 3/1989 | Rempel et al. . |
| 4,816,525 | 3/1989 | Rempel et al. . |

FOREIGN PATENT DOCUMENTS 1558491 1/1980 United Kingdom .

*Primary Examiner*—Bernard Lipman
*Attorney, Agent, or Firm*—Stevens, Davis, Miller & Mosher

[57] ABSTRACT

An improved process is provided for the hydrogenation of nitrile rubber wherein the molecular weight increase during the hydrogenation process is minimized and controlled, the improvement being that the hydrogenation is undertaken in the presence in the solution of an $NH_2$-containing compound selected from ammonia and a $C_1$ to $C_{20}$ primary amine.

19 Claims, No Drawings

AMINE MODIFIED HYDROGENATION OF NITRILE RUBBER

FIELD OF THE INVENTION

The present invention relates to an improved process for the production of hydrogenated nitrile rubber.

BACKGROUND OF THE INVENTION

It is well known that the carbon-carbon double bonds in polymers may be hydrogenated by treatment of the polymer with hydrogen in the presence of a number of catalysts. It is also well known that the carbon-carbon double bonds in a nitrile rubber, the nitrile rubber being a polymer comprising a $C_4$-$C_6$ conjugated diolefin and a $C_3$-$C_5$ unsaturated nitrile, can be selectively hydrogenated, without significant hydrogenation of the $C\equiv N$ bonds, by treatment of the polymer with hydrogen in the presence of selected catalysts—for example, British Patent 1,558,491; U.S. Pat. Nos. 3,700,637; 4,384,081; 4,464,515 and 4,503,196. The use of ruthenium catalysts for the hydrogenation of nitrile rubbers is described in U.S. Pat. Nos. 4,631,315; 4,816,525 and 4,812,528.

In the hydrogenation of nitrile rubbers, it has been found that the molecular weight of the polymer, as indicated by the measured intrinsic viscosity or the Mooney viscosity, increases—this molecular weight increase is believed to be due to a low level of interaction occurring between two or more polymer molecules. The increase in molecular weight varies with the nature of the catalyst, the solvent used in the hydrogenation process and the reaction conditions used for the hydrogenation. The molecular weight increase is particularly noticeable when certain of the ruthenium catalysts are used and, in fact, under certain conditions the interaction between polymer molecules can be such that the hydrogenated polymer contains gelled (crosslinked) or insoluble polymer. Although a slight increase in molecular weight can be tolerated, if the molecular weight of the hydrogenated polymer is too high this causes it to be of low acceptability by the manufacturer of the products, such as hoses, gaskets, etc., because it is difficult to handle such high molecular weight polymers on conventional equipment.

Accordingly, the present invention is directed to an improved process wherein the molecular weight increase in the hydrogenation process is minimized and controlled.

SUMMARY OF THE INVENTION

The present invention provides an improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated while in solution in the presence of a divalent ruthenium catalyst selected from compounds of the general formula $RuXY(CO)ZL_2$, or $RuDE(CO)M_n$, or $RuGJM_3$ or $RuK_2N_2$ wherein X is selected from a halogen atom or a carboxylate group, Y is selected from a halogen atom, a hydrogen atom, a phenyl group, a carboxylate group or a phenylvinyl group, Z is selected from CO, pyridine, benzonitrile or no ligand and L is selected from the phosphine ligands of the general formula $PR_3$ in which R is selected from alicyclic or alkyl groups, n is 2 or 3 and when n is 3 D is a halogen atom and E is a hydrogen atom and when n is 2 D is selected from a halogen atom or a carboxylate group, E is selected from a halogen atom, a hydrogen atom, a phenyl group or a carboxylate group, and M is selected from the phosphine ligands of the formula $PA_3$ in which A is a phenyl group or a $C_1$ to $C_4$ alkyl group or mixtures thereof, G is selected from a halogen atom or a hydrogen atom, J is selected from a halogen atom or a carboxylate group, K is a carboxylate group and N is triphenylphosphine, the improvement being that the hydrogenation is undertaken in the presence of an $NH_2$-containing compound selected from ammonia and a $C_1$ to $C_{20}$ primary amine in the solution.

DETAILED DESCRIPTION

The nitrile rubber which is hydrogenated in the process of this invention is a polymer comprising a conjugated $C_4$-$C_6$ diolefin and a $C_3$-$C_5$ unsaturated nitrile. The conjugated $C_4$-$C_6$ diolefin is selected from butadiene, isoprene, piperylene and 2,3-dimethyl butadiene, with butadiene and isoprene being preferred and butadiene being most preferred. The conjugated diolefin forms from about 50 to about 85 per cent by weight of the polymer. The $C_3$-$C_5$ unsaturated nitrile is selected from acrylonitrile, methacrylonitrile and ethacrylonitrile, with acrylonitrile being most preferred and forms from about 15 to about 50 per cent by weight of the polymer. The polymer may also contain a small amount, that is from about 1 to about 10 per cent by weight of the polymer, of an unsaturated carboxylic acid selected from fumaric acid, maleic acid, acrylic acid and methacrylic acid and the conjugated diolefin forms from about 40 to about 84 per cent by weight of the polymer. The nitrile rubber has a molecular weight, as expressed by the Mooney viscosity (ML 1+4 at 100° C.) of from about 25 to about 70. A preferred nitrile rubber is a butadiene-acrylonitrile polymer having an acrylonitrile content of from about 25 to about 45 per cent by weight and having a Mooney viscosity (ML 1+4 at 100° C.) of from about 25 to about 60.

Suitable solvents for the hydrogenation process include the aryl compounds such as benzene, toluene, xylene, monochlorobenzene and dichlorobenzene, with monochlorobenzene being most preferred, aliphatic ethers such as tetrahydrofuran and dioxane, and aliphatic ketones such as methyl ethyl ketone, or mixtures of solvents such as monochlorobenzene and methyl ethyl ketone.

Hydrogen is provided as essentially pure dry gas at a pressure of from about 25 kg/cm² (355 psi) to about 100 kg/cm² (1420 psi).

The hydrogenation reaction is undertaken in a suitable reaction vessel equipped with a temperature regulating means and an agitator. The polymer solution is added to the reaction vessel, any necessary degassing is undertaken, and either the catalyst, pure or in solution, is added followed by pressurizing with hydrogen or the vessel is pressurized with hydrogen and the catalyst, pure or in solution, is added. The reactor is heated to the desired temperature at a suitable point following the addition of the polymer solution. Temperatures for the hydrogenation are from about 80° to about 200° C., preferably from about 100° C. to about 155° C. Hydrogen may be added to the reactor during the hydrogenation and the reaction is complete within about 2 to about 24 hours, although when the preferred catalysts are used the reaction time is from about 2 to about 8 hours. The degree of hydrogenation may be controlled by control of one or more of the reaction time, temperature or hydrogen pressure, preferably reaction time. On completion of the reaction, the reaction vessel is vented and the polymer recovered by contact with hot water/steam or an alcohol followed by drying.

The divalent ruthenium catalyst used in the process is selected from compounds of the general formula $$RuXY(CO)ZL_2, \text{ or } RuDE(CO)M_n,$$

$$\text{or } RuGJM_3 \text{ or } RuK_2N_2$$

wherein X is selected from a halogen atom or a carboxylate group, preferably is a halogen atom and most preferably is chlorine; Y is selected from a halogen atom, a hydrogen atom, a phenyl group, a carboxylate group or a phenylvinyl group, preferably is a chlorine atom or a hydrogen atom and most preferably is a hydrogen atom; Z is selected from CO, pyridine, benzonitrile or no ligand; L is selected from phosphine ligands of the general formula $PR_3$ wherein R is selected from alicyclic or alkyl groups. A preferred alicyclic group is cyclohexyl. The alkyl group is preferably selected from isopropyl, tertiary butyl and secondary butyl. Preferably R is cyclohexyl. n is 2 or 3 and when n is 3 D is a halogen atom and E is a hydrogen atom and when n is 2 D is selected from a halogen atom or a carboxylate group; E is selected from a halogen atom, a hydrogen atom, a phenyl group or a carboxylate group, preferably a halogen atom or a hydrogen atom; M is selected from the phosphine ligands of formula $PA_3$ in which A is a phenyl group or a $C_1$ to $C_4$ alkyl group or mixtures thereof; G is selected from a halogen atom or a hydrogen atom; J is selected from a halogen atom or a carboxylate group; K is a carboxylate group and N is triphenylphosphine.

Specific examples of suitable divalent ruthenium catalysts include carbonylchlorohydrido bis (tricyclohexylphosphine) ruthenium (II), carbonylchlorohydrido bis (trisopropylphosphine) ruthenium (II), carbonylchloro benzoato bis(triphenylphosphine) ruthenium (II), carbonylchlorohydrido tris (triphenylphosphine) ruthenium (II), and dichloro tris (triphenylphosphine) ruthenium (II).

The concentration of the ruthenium catalyst in the solution is not critical and usually is within the range of from about 0.015 to about 2 per cent by weight of the nitrile rubber. For economic reasons it is desirable to minimize the concentration of the ruthenium catalyst and accordingly it is preferably used within the range of from about 0.015 to about 0.15 per cent by weight of the nitrile rubber.

The improved process of this invention requires the presence, during the hydrogenation, of an $NH_2$-containing compound selected from ammonia and a $C_1$ to $C_{20}$ primary amine. The $NH_2$-containing compound is present in the solution during the hydrogenation process—that is to say, it can be added to the reactants at any convenient stage before the hydrogenation reaction is initiated. When the $NH_2$-containing compound is ammonia it is used as the essentially dry, essentially pure material, either gaseous or liquid although gaseous is preferred for control purposes. Suitable primary amines are selected from the primary amines of the formula $R-NH_2$ where R is selected from $C_1$ to $C_{20}$ alkyl groups which may be linear or branched, $C_6$ to $C_{12}$ alicyclic groups, $C_6$ to $C_9$ aryl groups, $C_7$ to $C_{10}$ aralkyl groups and fused ring groups such as adamantane. Examples of suitable amines include compounds where R is methyl, ethyl, n-butyl, sec-butyl, tert-butyl, amyl, iso-amyl, octyl, dodecyl, tetradecyl, octadecyl and mixtures thereof, cyclohexyl and cyclooctyl, phenyl and tolyl, and benzyl and methyl substituted benzyl. Preferred primary amines include the $C_4$ to $C_{20}$ alkyl primary amines and cyclohexylamine present at a concentration of from about 0.4 to about 1 parts by weight per 100 parts by weight of nitrile rubber.

The concentration in the reactor of the ammonia is from about 0.1 to about 0.3, preferably from about 0.15 to about 0.25 parts by weight per 100 parts by weight of nitrile rubber and of the primary amine is from about 0.2 to about 3, preferably from about 0.4 to about 1, parts by weight per 100 parts by weight of nitrile rubber. The presence of the $NH_2$-containing compound during the hydrogenation process leads to the production of a hydrogenated nitrile rubber which has an acceptably small increase in the molecular weight compared to that of the original nitrile rubber. The molecular weight may be measured as the Mooney viscosity determined at 125° C. (ML 1+4 at 125° C.) or as the intrinsic viscosity determined at 35° C. in monochlorbenzene. In the absence of the $NH_2O$-containing compound or in the presence of a secondary or tertiary amine the hydrogenation process yields a polymer having a significantly increased molecular weight compared to the molecular weight of the original nitrile rubber.

The following examples illustrate the scope of the invention and are not intended to limit the same.

EXAMPLES

Example 1

A 300 ml glass lined stainless steel autoclave equipped with temperature control means, an agitator and solution and hydrogen gas addition points was used. A butadiene-acrylonitrile nitrile rubber having a bound acrylonitrile content of about 38 weight per cent and a Mooney viscosity (ML 1+4 at 125° C.) of about 29 was used at a concentration of about 9.3 weight per cent in chlorobenzene. The catalyst used was carbonylchlorohydrido bis (tricyclohexylphosphine) ruthenium (II) at a concentration in the reactor of about 0.05 weight per cent based on the nitrile rubber. Hydrogen was added to the reactor to a total pressure of about 56.3 kg/cm² (800 psi). The amine of the type and in the quantity shown in Table I was added to the reactor. The reaction temperature was about 145° C. The reaction time was between 4 and 8 hours. The results in Table I clearly show that primary amines do not significantly interfere with the hydrogenation reaction and that the hydrogenated nitrile rubber has not significantly increased in molecular weight, as shown by the intrinsic viscosity, compared to when no amine or when secondary or tertiary amines are used. An intrinsic viscosity of about 1.5 approximately corresponds to a Mooney viscosity (ML 1+4 at 125° C.) of about 55 and an intrinsic viscosity of about 1.9 approximately corresponds to a Mooney viscosity of about 100.

TABLE I

| Exp't. No. | Amine Type | Amine Conc. | Reaction Time | % Hydrog. | Intrinsic Viscosity |
|---|---|---|---|---|---|
| 1 | — | — | 4 | 99+ | 1.93 |
| 2 | A | 0.39 | 5 | 99+ | 1.66 |

TABLE I-continued

| Exp't. No. | Amine Type | Amine Conc. | Reaction Time | % Hydrog. | Intrinsic Viscosity |
|---|---|---|---|---|---|
| 3 | A | 0.78 | 6 | 99+ | 1.56 |
| 4 | A | 1.17 | 7 | 99+ | 1.51 |
| 5 | B | 0.6 | 6 | 99+ | 1.56 |
| 6 | C | 0.7 | 8 | 98 | 1.48 |
| 7 | D | 0.77 | 6 | 99+ | 1.78 |
| 8 | E | 0.73 | 4 | 99+ | 1.93 |

Notes:
Amine Type
A = octylamine, B = hexylamine, C = n-butylamine, D = di-butylamine, E = triethylamine
Amine Conc.
Concentration of amine, weight percent based on nitrile rubber.
% Hydrog.
Percent hydrogenation of C=C bonds in nitrile rubber, determined by infra-red spectroscopy and $^1$H NMR spectroscopy.
Intrinsic Viscosity
Measured at 35° C. in chlorobenzene using the Ubbelohde method; shown as dL/g.

Example 2

The equipment and procedure was the same as that used in Example 1. In this example the amines used were (Amine Type F) cyclohexylamine and (Amine Type G) morpholine and the results are shown in Table II.

TABLE II

| Exp't. No. | Amine Type | Amine Conc. | Reaction Time | % Hydrog. | Intrinsic Viscosity |
|---|---|---|---|---|---|
| 10 | — | — | 4 | 99+ | 1.93 |
| 11 | F | 0.85 | 6 | 99+ | 1.50 |
| 12 | F | 0.6 | 6 | 99+ | 1.58 |
| 13 | G | 0.6 | 4 | 99+ | 2.03 |

The results show that the molecular weight of the polymer is not significantly increased in the presence of the primary amine during the hydrogenation reaction.

Example 3

A two gallon reactor was used. The nitrile rubber was the same as that used in Example 1 and was used as a 9.3 per cent solution in chlorobenzene. The same catalyst as in Example 1 was used at a concentration of about 0.07 weight per cent based on nitrile rubber. Hydrogen was added to a pressure of about 84.5 kg/cm$^2$ (1200 psi). The amine used was dodecylamine. The reaction temperature was 145° C. The results are shown in Table III with the molecular weight being shown as the Mooney viscosity (ML 1+4 at 125° C.) for polymer samples recovered by contact with steam/hot water and subsequently dried.

TABLE III

| Exp't. No. | Amine Conc. | Reaction Time | % Hydrog. | Mooney Viscosity |
|---|---|---|---|---|
| 20 | 0.78 | 5 | 99.5+ | 49.5 |
| 21 | 1 | 4.5 | 99.5+ | 50 |
| 22 | 1.5 | 5 | 99.5+ | 50 |
| 23 | 2 | 5 | 99.3 | 48.5 |
| 24 | 0.4 | 4 | 99.5+ | 71 |
| 25 | 0.1 | 6 | 99.5+ | 93 |
| 26 | 0 | 4 | 99.5+ | 100 |

Example 4

Using the procedure and nitrile rubber described in Example 1 except that the nitrile rubber concentration was 3 weight per cent, additional catalyst systems were studied. The primary amine used was cyclohexylamine at a concentration of 3 weight per cent based on the nitrile rubber in Experiments 31, 32 and 33, Experiment 30 being a control with no added amine. The solvent was monochlorobenzene, the reaction temperature was 140° C. and the hydrogen pressure was 42.2 kg/cm$^2$ for Experiments 30, 31 and 32 and 56.3 kg/cm$^2$ for Experiment 33. The catalysts used were for Experiments 30 and 31 carbonylchloro benzoato bis(triphenylphosphine) ruthenium II, for Experiment 32 carbonylchlorohydrido tris(triphenylphosphine) ruthenium II and for Experiment 33 dichloro tris(triphenylphosphine) ruthenium II. The results are shown in Table IV.

TABLE IV

| Exp't. No. | Catalyst Conc. | Reaction Time | % Hydrog. | Intrinsic Viscosity |
|---|---|---|---|---|
| 30 | 0.5 | 0.25 | nd | nd |
| 31 | 0.5 | 10 | 96.5 | 1.79 |
| 32 | 0.6 | 20 | 89.5 | nd |
| 33 | 0.5 | 22 | 92 | nd |

In Experiment 30, the product was a gelled mass. For Experiments 32 and 33, the intrinsic viscosities were not determined but are believed to be of a similar order to that for Experiment 31.

Example 5

Using the procedure described in Example 1, additional amines were tested. The materials and conditions used were as described and the results are shown in Table V.

TABLE V

| Exp't. No. | Amine Type | Amine Conc. | Reaction Time | % Hydrog. | Intrinsic Viscosity |
|---|---|---|---|---|---|
| 40 | H | 0.35 | 5 | 99+ | 1.62 |
| 41 | H | 0.7 | 7 | 97.2 | 1.46 |
| 42 | I | 0.7 | 6 | 99+ | 1.59 |
| 43 | J | 0.75 | 6 | 99+ | 1.58 |
| 44 | K | 0.37 | 3.5 | 99+ | 1.73 |
| 45 | K | 0.75 | 5 | 99+ | 1.52 |

Amine Type — H = aniline, I = benzylamine, J = isoamylamine, K = tert-butylamine

Example 6

Using the procedure and conditions described in Example 3, further amines were tested with the results shown in Table VI.

TABLE VI

| Exp't. No. | Amine Type | Amine Conc. | Reaction Time | % Hydrog. | Mooney Viscosity |
|---|---|---|---|---|---|
| 50 | L | 0.78 | 8.5 | 99.3 | 64 |
| 51 | M | 0.78 | 2 | 99.5+ | 66 |

Amine Type — L = stearyl amine product, commercially available as Kemamine P-900D, believed to contain about 5% C$_{16}$ amine, about 93% stearylamine and about 2% C$_{20}$ amine.
M = hydrogenated tallow amine, commercially available as Kemamine P-970D, believed to contain about 5% C$_{14}$ amine, 30% C$_{16}$ amine, about 65% stearylamine.

Example 7

Using the materials and procedure described in Example 1, ammonia was used as the NH$_2$-containing compound. After the reactor and contents had been purged with hydrogen, ammonia was added to a concentration of 0.19 weight per cent based on the nitrile rubber. The results are shown in Table VII from which it is clear that ammonia does not significantly interfere with the hydrogenation reaction and that the hydrogenated nitrile rubber has not significantly increased in molecular weight.

TABLE VII

| Exp't No. | Reaction Time | % Hydrog. | Intrinsic Viscosity |
|---|---|---|---|
| 60 | 6.5 | 99.1 | 1.58 |
| 61 | 7 | 99.2 | 1.53 |

What is claimed is:

1. An improved process for the production of hydrogenated nitrile rubber wherein a nitrile rubber which is a polymer comprising a conjugated $C_4$–$C_6$ diolefin and a $C_3$–$C_5$ unsaturated nitrile is hydrogenated while in solution in the presence of a divalent general formula $RuXY(CO)ZL_2$, or $RuDE(CO)M_n$, or $RuGJM_3$, or $RuK_2N_2$ wherein X is selected from a halogen atom or a carboxylate group, Y is selected from a halogen atom, a hydrogen atom, a phenyl group, a carboxylate group or a phenylvinyl group, Z is selected from CO, pyridine, benzonitrile or no ligand and L is selected from the phosphine ligands of the general formula $PR_3$ in which R is selected from alicyclic or alkyl groups, n is selected from 2 or 3 and when n is 3 D is a halogen atom and E is a hydrogen atom and when n is 2 D is selected from a halogen atom or a carboxylate group, E is selected from a halogen atom, a hydrogen atom, a phenyl group or a carboxylate group and M is selected from the phosphine ligands of the formula $PA_3$ in which A is a phenyl group or a $C_1$ to $C_4$ alkyl group or mixtures thereof, G is selected from a halogen atom or a hydrogen atom, J is selected from a halogen atom or a carboxylate group, K is a carboxylate group and N is triphenylphosphine, the improvement being that the hydrogenation is undertaken in the presence of an $NH_2$-containing compound selected from ammonia and a $C_1$ to $C_{20}$ primary amine.

2. The process of claim 1 wherein the $NH_2$-containing compound is a primary amine selected from the $C_1$ to $C_{20}$ alkyl primary amines.

3. The process of claim 1 wherein the $NH_2$-containing compound is a primary amine selected from the $C_6$ to $C_{12}$ alicyclic primary amines.

4. The process of claim 1 wherein the $NH_2$-containing compound is a primary amine selected from the $C_6$ to $C_9$ aryl primary amines.

5. The process of claim 1 wherein the $NH_2$-containing compounding is a primary amine selected from the $C_7$ to $C_{10}$ aralkyl primary amines.

6. The process of claim 1 wherein the $NH_2$-containing compound is ammonia.

7. The process of claim 1 wherein the $NH_2$-containing compound is a primary amine present at a concentration of from about 0.2 to about 3 parts by weight per 100 parts by weight of the nitrile rubber.

8. The process of claim 1 wherein the $NH_2$-containing compound is ammonia present at a concentration of from about 0.1 to about 0.3 parts by weight per 100 parts by weight of the nitrile rubber.

9. The process of claim 2 wherein the primary amine is a $C_4$ to $C_{12}$ alkyl primary amine present at a concentration of from about 0.4 to about 1 parts by weight per 100 parts by weight of the nitrile rubber.

10. The process of claim 3 wherein the primary amine is cyclohexylamine present at a concentration of from about 0.4 to about 1 parts by weight per 100 parts by weight of the nitrile rubber.

11. The process of claim 1 wherein the nitrile rubber is in solution in a solvent selected from benzene, toluene, xylene, chlorobenzene and dichlorobenzene and the hydrogen pressure is from about 25 to about 100 $kg/cm^2$.

12. The process of claim 1 wherein the divalent ruthenium catalyst is selected from carbonylchlorohydrido tris (triphenylphosphine) ruthenium II and dichloro tris (triphenylphosphine) ruthenium II.

13. The process of claim 1 wherein the divalent ruthenium catalyst is selected from carbonylchlorohydrido bis (tricyclohexylphosphine) ruthenium II and carbonylchlorohydrido bis (triisopropylphosphine) ruthenium II.

14. The process of claim 12 wherein the $NH_2$-containing compound is an amine selected from a $C_4$ to $C_{12}$ alkyl primary amine and cyclohexylamine and is present at a concentration of from about 0.4 to about 1 parts by weight per 100 parts by weight of nitrile rubber.

15. The process of claim 13 wherein the $NH_2$-containing compound is an amine selected from a $C_4$ to $C_{12}$ alkyl primary amine and cyclohexylamine and is present at a concentration of from about 0.4 to about 1 parts by weight per 100 parts by weight of nitrile rubber.

16. The process of claim 12 wherein the $NH_2$-containing compound is ammonia and is present at a concentration of from about 0.15 to about 0.25 parts by weight per 100 parts by weight of nitrile rubber.

17. The process of claim 13 wherein the $NH_2$-containing compound is ammonia and is present at a concentration of from about 0.15 to about 0.25 parts by weight per 100 parts by weight of nitrile rubber.

18. The process of claim 1 wherein the nitrile rubber is a polymer containing from about 50 to about 85 weight per cent of butadiene or isoprene and from about 15 to about 50 weight per cent of acrylonitrile.

19. The process of claim 1 wherein the nitrile rubber is a polymer containing from about 40 to about 84 weight per cent of butadiene, from about 15 to about 50 weight per cent of acrylonitrile and from about 1 to about 10 weight per cent of an unsaturated carboxylic acid selected from fumaric acid, maleic acid, acrylic acid and methacrylic acid.

* * * * *

UNITED STATES PATENT AND TRADEMARK OFFICE
CERTIFICATE OF CORRECTION

PATENT NO. : 5,075,388
DATED : December 24, 1991
INVENTOR(S) : Gary L. REMPEL et al It is certified that error appears in the above-identified patent and that said Letters Patent is hereby corrected as shown below:

Column 7, line 15, after "divalent" the following should be inserted: --ruthenium catalyst selected from compounds of the--

Signed and Sealed this

Twenty-ninth Day of June, 1993

*Attest:*

MICHAEL K. KIRK

*Attesting Officer*  Acting Commissioner of Patents and Trademarks